United States Patent [19]

Deerkoski

[11] 3,737,781

[45] June 5, 1973

[54] SIGNAL-TO-NOISE RATIO DETERMINATION CIRCUIT

[75] Inventor: Leonard F. Deerkoski, Laurel, Md.

[73] Assignee: The United States of America as represented by the Administrator of the National Aeronautics and Space Administration, Washington, D.C.

[22] Filed: Sept. 15, 1971

[21] Appl. No.: 180,683

[52] U.S. Cl..................................325/363, 325/67
[51] Int. Cl...............................................H04b 3/46
[58] Field of Search.......................325/305, 306, 67, 325/363, 366, 367, 368, 369; 324/76

[56] References Cited

UNITED STATES PATENTS

| | | | |
|---|---|---|---|
| 3,287,646 | 11/1966 | Taylor | 325/363 |
| 3,122,704 | 2/1964 | Jones | 325/363 |
| 3,444,471 | 5/1969 | French | 325/305 |

*Primary Examiner*—Benedict V. Safourek
*Attorney*—R. F. Kempf, E. Levy and John R. Manning

[57] ABSTRACT

A signal-to-noise ratio (SNR) determination circuit to determine the SNR of an input having signal components (S) within a given frequency range and noise components (N), without actual measurement of the noise (N) components. Input means receive the input, and first filter means having a frequency bandpass range different from said given frequency range are connected to the input means to convert the db level of the input SNR to another level. Bandpass limiter means having a constant signal plus noise output level are connected to the output of the first filter means, the signal-to-noise ratio of the input to the bandpass limiter means being linearly related to the dbm level of signal components at the output thereof, for a given db range of converted SNR input levels. Calibrating means are connected to the bandpass limiter means and are responsive to the signal components at the output thereof to derive the SNR of the input to the determination circuit. The SNR determination circuit is disclosed for use in a diversity receiver having a plurality of input channels. Weighting means are used to weight the channels prior to summation to provide maximum signal-to-noise ratio at the output of a combiner.

10 Claims, 3 Drawing Figures

INVENTOR
LEONARD F. DEERKOSKI

BY Robert F Kempf
ATTORNEY

INVENTOR
LEONARD F. DEERKOSKI

ATTORNEY

SIGNAL-TO-NOISE RATIO DETERMINATION CIRCUIT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of Invention

This invention relates to a signal-to-noise ratio (SNR) determination means and to means to optimize diversity receiver performance by improvement of output SNR. The invention has particular utility in coherent diversity receivers wherein individual channels are weighted to provide the greatest possible output signal-to-noise ratio.

2. Prior Art

The prior art does not disclose a circuit for determining SNR in a manner similar to the applicant's. Furthermore, most prior art optimization schemes determine relative signal-to-noise ratios of each channel of a receiver on the basis only of received signal levels, disregarding noise in each channel. The Munch U.S. Pat. No. 3,495,175, discloses a prior art diversity system wherein determination of channel relative signal-to-noise ratios is made by separately measuring both the signal and the noise components of received intelligence. Another known type of system is disclosed by Shiki U.S. Pat. No. 3,320,115, which monitors the SNR of received signals by extracting and monitoring only level variations of noise components in the applied signals.

Prior art SNR determination circuits and optimization circuits attendant therewith are extremely susceptible to errors. Further, when used in coherent diversity receivers using the known AGC weighting technique, several disadvantages result as follows:

1. Disability to detect noise figure differences between channels;
2. Disability to detect antenna noise temperature differences between array elements in a diversity system;
3. Disability to compensate for gain or loss differences between channels without causing errors in weighting;
4. Disability to feasibly perform SNR determinations and weighting;
5. Disability to properly perform diversity combining with antenna elements of unequal gain.

SUMMARY OF INVENTION

These and other disadvantages of prior art circuits for determining SNR are solved by the instant invention wherein a simplified SNR determination circuit is employed which provides an accurate indication of SNR without actual measurement of the noise component. The SNR determination circuit of applicant's invention enables a substantial improvement of the operation of diversity receivers when used in conjunction therewith, without requiring complicated and expensive circuits to derive actual SNR measurements.

Applicant's invention makes use of the characteristics of a bandpass limiter to derive a determination of SNR that is linearly related to the true SNR. The input to the SNR determination circuit comprises a bandpass filter having a frequency range substantially wider than the band of IF information signals. This converts the SNR at the output of the bandpass filter to a db level which is lower than the true SNR of the IF information signals. This is done so that the SNR at the input to the bandpass limiter is converted to a range wherein the bandpass limiter output signal (S) versus the input SNR is linear. The characteristics of the bandpass limiter are such that the output signal (S) therefrom contains a complete description of the SNR at the input to the bandpass limiter which can be calibrated to derive the true SNR, thereby making it unnecessary to measure the noise component. An embodiment of the invention wherein the SNR determination circuit is employed in a coherent diversity receiver is also disclosed.

Applicant's invention provides certain advantages over the prior art such as:

1. Simple rapid SNR measurement;
2. True $E_s/E_n^2$ weighting for a diversity receiver
3. Optimal operation with arbitrary channel antenna gains, line losses, noise figures, etc.
4. No upper limit on the number of channels to be combined.
5. No assumptions or approximations in the weighting process are required as do present AGC weighting receivers.
6. Easy installation in receivers presently equipped with AGC weighting.
7. No requirement for rms noise measurements that inherently exhibit a long time constant and prevent rapid noise measurements.
8. Combination of an unlimited number of channels without complex interface equipment.

DETAILED DESCRIPTION OF THE INVENTION

Figure 1:
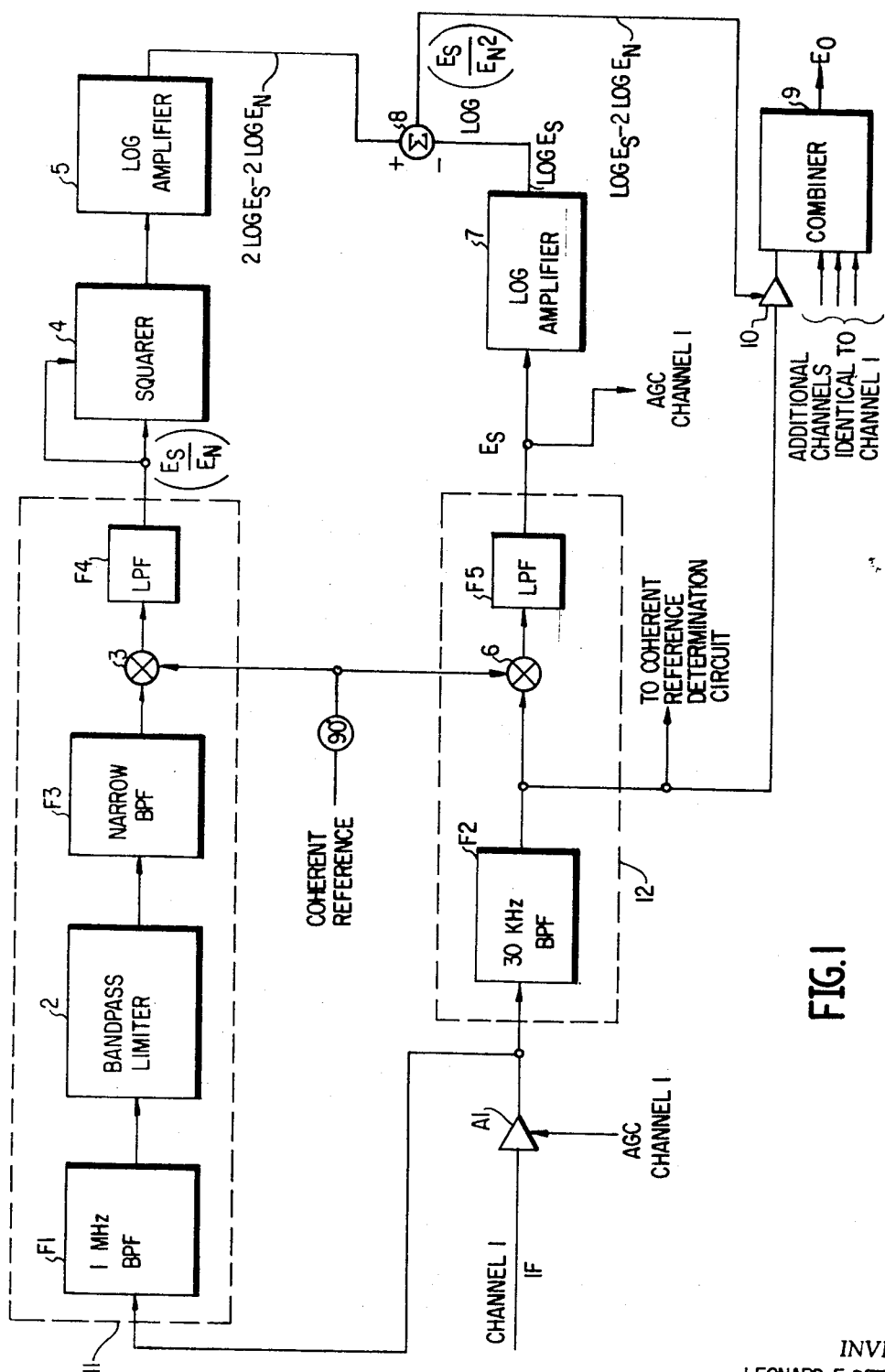
FIG. 1 is a block diagram of the applicant's SNR determination circuit and weighting circuitry for use in a coherent diversity receiver.

The principle of operation of the signal-to-noise determination circuit according to applicant's invention, may be described with relation to FIG. 1 in conjunction with the IF portion of channel 1 of a coherent diversity receiver. The signal (S) and noise (N) input components are applied from the phase lock section of the coherent diversity receiver via IF input channel 1 connected to amplifier A1, which operates with automatic gain control (AGC) derived from coherent detection of the amplitude of the signal (S) component as described hereafter.

The output of amplifier A1 is applied to bandpass filter F1 at the input of the SNR determination circuit 11 and to the input of the signal (S) detection portion 12 of receiver channel 1. For illustrative purposes, the bandwidth of signals at the output of amplifier A1 would typically be 1 MHz or more and the IF information bandwidth would typically be 30 KHz. The output of amplifier A1 is thus applied to 1 MHz bandpass filter F1, which comprises the first component of the SNR determination circuit, and to 30 KHz bandpass filter F2 of the signal (S) detection circuit of receiver channel 1.

The bandwidth of filter $F1$ was chosen according to the relationship $BW_{F1} = 33\ BW_{F2}$, wherein $BW_{F2}$ is equal to the IF information bandwidth and $BW_{F1}$ refers to the bandwidth of filter F1. The signal-to-noise ratio $(SNR)_1$ at the output of filter F1 will then be approximately 15 db lower than the IF signal-to-noise ratio $(SNR)_2$ at the output of filter $F2$, because of the bandwidth relationship between filters $F1$ and $F2$:

$$\Delta SNR = SNR_2 - SNR_1 = 10\ \log_{10}(BW_{F1}/BW_{F2})$$

The output of filter F1 is connected to the input of bandpass limiter 2 which may comprise a saturated amplifier of the type described by W. B. Davenport in "Signal-to-Noise Ratios in Bandpass Limiters," Journal of Applied Physics, pp. 720–727 June, 1953). Bandpass limiter 2 provides an essentially constant output signal plus noise $(S+N)$.

The signal $(S)$ and noise $(N)$ components of the power out of bandpass limiter 2 are related to the signal-to-noise ratio $(SNR)_1$ at the input to the bandpass limiter by the following equations:

$$S \sim \frac{2L^2}{\pi} \frac{4(SNR)_1/\pi}{\frac{4}{\pi}+(SNR)_1} \quad (1)$$

$$N \simeq \frac{2L^2}{\pi} \frac{\frac{4}{\pi}}{1+2(SNR)_1} \quad (2)$$

The value of L is related to the peak output voltage of bandpass limiter 2 and is a constant. These relationships are described by F.M. Gardiner in "Phaselock Techniques" John Wiley & Sons, Inc. (1960) and can be solved to derive $SNR_o$ at the output of the bandpass limiter as follows:

$$SNR_o \simeq (SNR)_i\ 1 + 2\ (SNR)_1/4/\pi + (SNR)_1 \quad (3)$$

Figure 2:
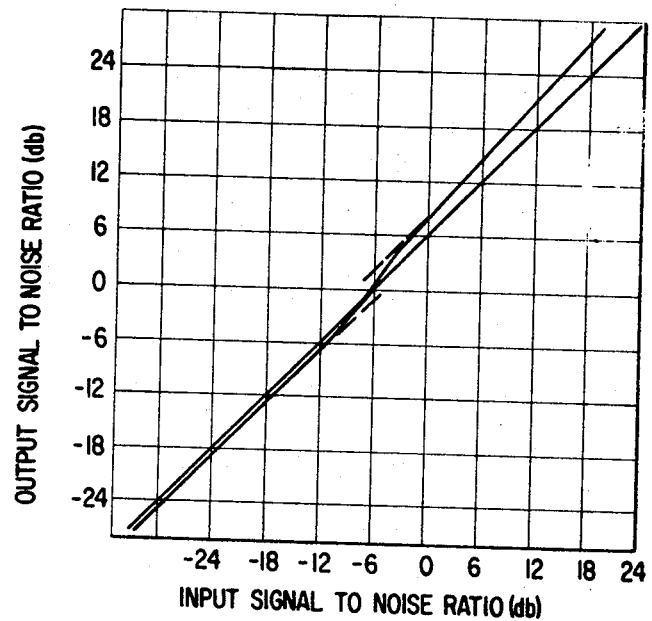
FIG. 2 is a graph showing the SNR characteristics of a bandpass limiter.

The relationship is shown graphically in FIG. 2.

The significance of equations (1) and (2) above is the relationship between output signal $(S)$ and input $SNR$. Thus, the signal-to-noise ratio of input signal to the bandpass limiter completely defines the output signal $(S)$ therefrom, because constant L is determinable. Since the output $(S+N)$ of the bandpass limiter is constant, and having the input to output $SNR$ charactertics (Equation (3), FIG. 2), the output signal $(S)$ from the bandpass limiter is defined by the input $SNR$ to the bandpass filter. The relationship is shown in FIG. 3.

Figure 3:
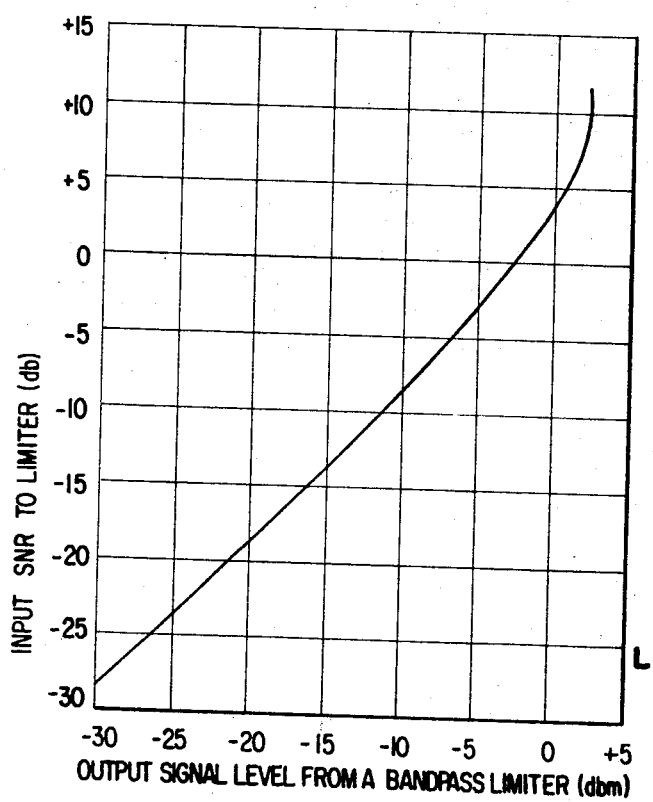
FIG. 3 is a graph showing the relationship between output signal (S) and input SNR of a bandpass limiter.

Note from FIG. 3 that the output signal level $(S)$ from the bandpass limiter versus the input $SNR$ thereto is non-linear in the region of acceptable IF signal-to-noise ratios. However, filter F1 in the SNR determination circuit has a wider bandpass range than the IF information bandwidth. Thus, if a 30 KHz IF information bandwidth is assumed, and a 1 MHz bandpass filter is connected to the output of amplifier A1, the consequence is that the bandpass limiter of FIG. 1 sees a SNR that is approximately 15 db below the IF $SNR$ at the output of filter F2.

As an example, a 10 db IF signal-to-noise ratio would, by the use of the described 1 MHz bandpass filter connected between the output of amplifier A1 and the bandpass limiter, be converted by 15 db to a −5 db $SNR$ at the input to the bandpass limiter. For input SNR below −5 db the bandpass limiter is operative to produce a linear relationship between input $SNR$ and output signal $(S)$ within 0.5 db.

Thus, when the IF signal-to-noise ratio falls below 10 db, the bandpass limiter remains operative within the linear region shown in FIG. 3, and consequently operates as desired. The output of the bandpass limiter comprises signal and noise components within a 1 MHz bandwidth. Since the limiter signal output component $(S)$ contains a complete description of the SNR existing at the input to the bandpass limiter, the output noise therefrom is of no further value in determining SNR at the input to the bandpass limiter, and can be eliminated by narrow bandpass filter F3 connected between the output of the bandpass limiter 2 and the input to mixer 3.

The output of filter F3 is applied to mixer 3 for coherent detection by mixing with the phase lock reference signal in known manner. The output of mixer 3 is applied to low pass filter F4 to remove the high frequency term and provide the output of SNR determination circuit 11 which is a DC output signal that is linearly related to the true SNR at the output of amplifier A1.

The true IF SNR is higher than that determined by the SNR determination circuit because of the bandwidth ratios between filters F1 and F2. The signal-to-noise ratio derived from the input to bandpass limiter 2 is thus lower than that existing at the bandwidth to which the IF information is restricted. However, as explained above, the relationship therebetween is a constant value which depends upon the relative bandwidths of filters F1 and F2. Therefore, the detected output of the low pass filter F4, which is indicative of the SNR at the input to bandpass limiter 2, may be calibrated to indicate the true SNR of the IF at the output of filter F2.

The described SNR determination circuit 11 has particular utility for use in a coherent diversity receiver wherein each channel must be weighted directly as the signal $(S)$ voltage and inversely as the square of the noise $(N)$ power therein. This means that optimum performance of a diversity receiver can be achieved only if the input channels are weighted in proportion to their respective $E_s/E_n^2$. The block diagram of FIG. 1 shows an embodiment of applicant's SNR determination circuit within a phase lock receiver having AGC control to maintain the signal level $(S)$ constant at IF.

An important characteristic of this invention should be realized. When the IF SNR falls below 10 db, the applicant's SNR determination circuit remains within the linear region and operates properly. When the IF SNR rises, the SNR determination circuit inherently becomes less sensitive and its weighting capability is diminished. This is precisely the desired performance of a diversity receiver. Diversity receivers need only weight the incoming signals accurately when the signal-to-noise ratio at IF is less than approximately 10 db. For higher signal-to-noise ratios, the improvement from combining is inconsequential.

The process of widening the bandwidth in the SNR determination portion of the receiver does not seriously affect its performance since the signal has already been phase locked in a different part of the receiver at a narrower bandwidth. By using the phase lock reference in the mixing stage of the SNR determination portion of the receiver, followed by low pass filter F4, the added noise is in effect eliminated.

A multi-channel diversity receiver according to this invention would preferably use one SNR determination circuit for each channel. The SNR determination circuit in conjunction with the AGC level for each channel enables the weighting process for each channel independent of all other channels. Subsequent to weighting, the output from each channel is summed in the combiner (9).

The weighting circuitry is described with reference to the coherent diversity receiver of FIG. 1. The DC level at the output of filter F4 is applied to squarer circuit 4, which functions to square the output of filter F4 and feed it to log amplifier 5. The voltage existing at the output of log amplifier 5 ($2 \log E_s - 2 \log E_n$) is thereby linearly related to the SNR power ratio at IF.

The output of filter F2 is applied for detection to mixer 6 which has an additional input thereto connected to the phase lock reference. The output of mixer 6 is connected to low pass filter F5 to remove the high frequency term and provide a DC output signal indicative of the signal (S) component of the IF input to channel 1. The automatic gain control (AGC) in a coherent diversity receiver is a measure of the signal (S) voltage level in a particular channel. Thus, in FIG. 1, the voltage at the output of filter F5 is a measure of the signal (S) voltage level in channel 1. The output of filter F5 is connected to log amplifier 7, the output of the latter being linearly related to $\log E_s$. The outputs of log amplifiers 5 and 7 are connected to subtractor 8 in a manner wherein the output of log amplifier 7 is subtracted from the output of log amplifier 5 to provide an output linearly related to ($\log E_s - 2 \log E_n$).

The output of subtractor 8 is thus linearly related to the log of the ratio ($E_s / E_n^2$). This is the desired weighting factor for channel 1 of the $n$ channel array shown in FIG. 1, and is applied to a voltage controlled amplifier 10 which receives the IF information signals and feeds them to the combiner 9 after weighting in response to the weighting factor.

In coherent receivers for nondiversity applications, the SNR determination circuit according to applicant's invention may be connected to provide a continuous indication of SNR. Further, where AGC monitors are provided, conversion can be made to true SNR monitors.

Although the invention is described herein for only one set of bandwidth ratios and a phase lock receiver, these are not absolutely necessary. Other adaptive methods of phasing diversity receivers are available, and these are also compatible with applicant's invention if a known reference is established to coherently detect the signal level. The bandwidth ratios chosen are for the described example only. Any bandwidth ratio may be chosen as long as the detected signal (S) output of the SNR determination circuit is linear with IF SNR over the desired region. The bandpass limiter 2 ($S+N$) output level was assumed to be zero dbm in the illustrative example but this may be varied as desired.

Other modifications can be made to applicant's invention without departing from the scope thereof as provided in the appended claims.

I claim

1. A signal-to-noise ratio (SNR) determination circuit to determine the SNR of an input signal having a signal component (S) of a known frequency and known phase, as indicated by an additional constant amplitude, coherent reference input signal, and having unknown noise components (N), said input signal having a bandwidth $BW_s$, comprising:

input means to receive said input signal;

first filter means connected to said input means and having a bandwidth $BW_1$, greater than the signal bandwidth $BW_s$, for decreasing, by a predetermined level, the SNR of the input signal to a level less than $-5db$.

bandpass limiter means having a bandwidth $BW_L$ at least as large as $BW_1$, said bandpass limiter means including an input and an output, said output having a constant signal plus noise output power level, said bandpass limiter input being connected to said first filter means;

calibrating means, coupled to said output of said bandpass limiter means and responsive to said signal component at the output of said bandpass limiter means, for coherently detecting said signal component in accordance with said knowledge of both frequency and phase, to derive the SNR of the input to the SNR determination circuit, wherein said calibrating means is adapted to receive said constant amplitude coherent reference signal, and further includes a mixer having first and second inputs, the first mixer input being coupled to said bandpass limiter means output and said second mixer input being connected to receive said constant amplitude coherent reference signal, said mixer output having an ac and a DC component, and a low frequency bandpass filter coupled to said mixer output for extracting said DC component, said DC component thereby providing a calibrated measurement of the SNR of said input signal.

2. An SNR determination circuit as recited in claim 1, including a narrow band filter having the center of its pass band at said input frequency S, said narrow band filter being interposed between said bandpass limiter means and said first mixer input.

3. An SNR determination circuit as recited in claim 2 wherein the center of said narrow band filter is fixed and wherein the input signal to the SNR determination circuit remains constant in frequency.

4. Intermediate frequency (IF) receiver means including signal-to-noise ratio indicator means having an output representative of the true SNR of a received IF signal, said IF signal having a signal component (S) of a known frequency and phase, indicated by an additional constant amplitude coherent reference input signal, and having unknown noise components (N), comprising:

input means having bandwidth $BW_s$ to receive said IF signal, and an output, said input means establishing the noise temperature for said receiver means, said output being connected to a terminal;

first filter means having a first bandwidth $BW_1$ connected to said terminal to decrease the db level of the SNR at said terminal to a first db level $db_1$, where $BW_1$ greater than $BW_s$;

bandpass limiter means having a bandwidth $BW_L$ at least equal to said first bandwidth $BW_1$, said bandpass limiter means including an input and an output, said output having a constant signal plus noise output power level, said bandpass limiter means input being coupled to the output of said first filter means;

calibrating means coupled to the output of said bandpass limiter means and responsive to the signal component at the output of said bandpass limiter means to derive the SNR of the received radiation therein, said calibrating means being adapted to receive said constant amplitude coherent reference signal, a mixer having first and second inputs, the first mixer input being coupled to said bandpass limiter means output and said second mixer input being connected to receive said constant amplitude coherent reference signal, said mixer output having an ac and dc component, and a low frequency bandpass filter coupled to said mixer output for extracting said DC component thereby providing a calibrated measurement of the SNR of said IF signal;

second filter means connected to said terminal, said second filter means having a second bandwidth $BW_2$ less than said first bandwidth $BW_1$, said second filter means being connected to said terminal to convert the db level of the SNR at said terminal to a second db level $db_2$, said first level being related to said second level according to the relationship, $$SNR = db_2 - db_1 = 10 \log (BW_1/BW_2),$$

wherein the output of said second filter means contains the information in the received IF signal and is adapted to demodulation.

5. IF receiver means as recited in claim 4, including a narrow band filter having the center of its pass band at said known frequency of said signal S, said narrow band filter being interposed between said bandpass limiter means and said first mixer input.

6. IF receiver means as recited in claim 5, wherein the center of said narrow band filter pass band is fixed and wherein the IF signal to said input means remains constant in frequency.

7. In a diversity receiver having a plurality of IF channels, each channel having coherent AGC to maintain IF signal level constant therein and channel combiner means to provide for optimized output signal-to-noise ratio (SNR), THE IMPROVEMENT COMPRISING:

input means to receive said IF signal associated with each channel having a bandwidth $BW_s$ and an output, said input means establishing the noise temperature for said receiver means, said output being connected to a terminal associated with each channel;

a SNR determination circuit for each channel, each SNR determination circuit having first filter means having a first bandwidth $BW_1$, connected to said channel associated terminal to convert the db level of the SNR at said terminal to a first db level $db_1$; bandpass limiter means having a constant signal plus noise output level connected to the output of said first filter, the SNR of the input to the bandpass limiter being linearly related to the dbm level of the signal component of the output thereof for a given db range of converted input SNR levels; calibrating means connected to the bandpass limiter means and responsive to the signal component at the output thereof to derive the SNR of said IF channel signal input;

second filter means, said second filter means having a second bandwidth $BW_2$ different from said first bandwidth $BW_1$, being connected to said channel associated terminal to convert the db level of the SNR at said terminal to a second db level $db_2$, said first level being related to said second level according to the relationship $$\Delta SNR = db_2 - db_1 = 10 \log_{10} (BW_1/BW_2)$$

wherein the output of the second filter means contains the information in said IF signal and is coupled to said combiner;

detection means connected to the output of said second filter means to derive the level of signal component (S) of the input applied to said channel associated terminal;

a weighting means, said weighting means connected to the calibrating means and to the detection means to derive a weighting factor for each channel which is proportional to $E_{si}/E_{Ni}2$, where $E_s$ is signal voltage and $E_N$ is noise voltage in each channel i at said channel associated terminal, including variable gain means responsive to said weighting factor for adjusting the level of each channel input to said combiner, said variable gain means being interposed between said second filter means and said combiner.

8. A diversity receiver as recited in claim 7 further comprising third filter means connected between the bandpass limiter means and the calibrating means to filter out the noise (N) components from said bandpass limiter output.

9. A diversity receiver as recited in claim 8, wherein said calibrating means is adapted to receive an additional constant amplitude coherent reference signal signal, said calibrating means further including a mixer having first and second inputs, the first mixer input being coupled to said bandpass limiter means output and said second mixer input being connected to receive said constant amplitude coherent reference signal, said mixer output having an ac and dc output, and a low frequency bandpass filter coupled to said mixer output for extraction of said dc output.

10. A diversity receiver as recited in claim 9 wherein said weighting means includes:

a squarer circuit, said squarer circuit being coupled to said low frequency bandpass filter of said calibrating means for squaring the output of said low frequency bandpass filter;

a first log amplifier coupled to the output of said squarer circuit;

a second log amplifier coupled to the output of said detection means;

a subtractor means having first and second inputs and an output, said first subtractor input being coupled to the output of said first log amplifier, said second subtractor input being coupled to the output of said second log amplifier, said subtractor output being said weighting factor.

* * * * *